(12) United States Patent
Takahashi et al.

(10) Patent No.: US 6,652,979 B1
(45) Date of Patent: Nov. 25, 2003

(54) BIAXIALLY-ORIENTED POLYESTER FILM FOR FABRICATION

(75) Inventors: Kohzo Takahashi, Otsu (JP); Ryosuke Matsui, Otsu (JP); Masahiro Kimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/890,645

(22) PCT Filed: Nov. 28, 2000

(86) PCT No.: PCT/JP00/08355

§ 371 (c)(1),
(2), (4) Date: Aug. 2, 2001

(87) PCT Pub. No.: WO01/40357

PCT Pub. Date: Jun. 7, 2001

(30) Foreign Application Priority Data

Dec. 3, 1999 (JP) ............................................. 11-344155

(51) Int. Cl.$^7$ ......................... B32B 15/08; B32B 27/06; B32B 27/18; B32B 27/36

(52) U.S. Cl. ..................... 428/458; 428/35.7; 428/35.8; 428/35.9; 428/457; 428/480; 428/910; 524/275; 524/277; 528/275; 528/283; 528/302; 528/305; 528/308; 528/308.1; 528/308.3; 528/308.6; 528/308.8

(58) Field of Search ............................... 428/35.7, 35.8, 428/35.9, 457, 458, 480, 910; 524/275, 277; 528/275, 283, 302, 305, 308, 308.1, 308.3, 308.6, 308.8

(56) References Cited

U.S. PATENT DOCUMENTS

| 3,497,474 | A |   | 2/1970  | Jeurissen et al. ............. 260/75  |
|-----------|---|---|---------|---------------------------------------|
| 4,590,119 | A | * | 5/1986  | Kawakami et al. .......... 360/134    |
| 5,240,779 | A |   | 8/1993  | Ono et al. ................... 428/458 |
| 5,384,354 | A |   | 1/1995  | Hasegawa et al. .......... 524/539    |
| 5,391,429 | A | * | 2/1995  | Otani et al. ................. 428/201 |
| 5,424,121 | A | * | 6/1995  | Murakami et al. ........... 428/337   |
| 5,473,002 | A | * | 12/1995 | Gardiner et al. ............. 524/188 |
| 5,473,004 | A | * | 12/1995 | Ono et al. ................ 264/290.2 |
| 5,618,621 | A | * | 4/1997  | Hasegawa et al. .......... 428/343    |
| 5,686,510 | A | * | 11/1997 | Asai et al. .................. 428/35.8 |
| 5,780,158 | A | * | 7/1998  | Asai et al. .................. 428/412 |
| 5,858,507 | A | * | 1/1999  | Yoshida et al. .......... 264/288.4   |
| 5,885,689 | A | * | 3/1999  | Hasegawa et al. .......... 428/141    |
| 6,086,989 | A | * | 7/2000  | Kubo et al. ............... 156/308.2 |
| 6,086,991 | A | * | 7/2000  | Hubbard et al. ............. 427/299  |
| 6,103,368 | A | * | 8/2000  | Fukuda et al. .............. 428/337  |
| 6,127,473 | A | * | 10/2000 | Yoshida et al. ............. 524/493  |

FOREIGN PATENT DOCUMENTS

| EP | 0 625 539 A  | 11/1994 |
|----|--------------|---------|
| JP | 54-022234 B  | 8/1979  |
| JP | 2-202553 A   | 8/1990  |
| JP | 7-117120 A   | 5/1995  |
| JP | 8-333688 A   | 12/1996 |
| JP | 10-110046 A  | 4/1998  |
| JP | 10-120879 A  | 5/1998  |
| JP | 11-151752 A  | 6/1999  |
| JP | 11-181114 A  | 7/1999  |

* cited by examiner

*Primary Examiner*—Vivian Chen
(74) *Attorney, Agent, or Firm*—Kubovcik & Kubovcik

(57) ABSTRACT

Biaxially-drawn polyester film for fabrication which is characterized in that it is a film comprising polyester in which ethylene terephthalate units and/or ethylene naphthalate units are the chief structural component and containing 0.1–2 wt % of a carnauba wax and 1 to 200 ppm of germanium, and the melting point of said film is 180–270° C., the angle of contact to water is 70°–120°, and the planar orientation coefficient is 0.08–0.15. This film shows outstanding release properties following repeated use, use after fabrication and use in an aqueous environment and, furthermore, it exhibits stable properties with little variation and, in particular, following lamination to metal sheet such as steel or aluminium, when used as the inner face of a fabricated metal can, it is outstanding in its non-stick properties to the contents, and provides a combination of heat resistance and processability.

10 Claims, No Drawings

BIAXIALLY-ORIENTED POLYESTER FILM FOR FABRICATION

TECHNICAL FIELD

The present invention relates to biaxially-oriented polyester film used for fabrication, and it relates to film which shows outstanding release properties following repeated use, use after fabrication and use in an aqueous environment and, furthermore, which exhibits stable properties with little variation; in particular, it relates to biaxially-oriented polyester film for fabrication which, when used as the inner face of a fabricated metal can following lamination to metal sheet such as steel or aluminium, is outstanding in its non-stick properties in terms of the contents and provides both heat resistance and processability.

BACKGROUND ART

Polyester film is used in various applications due to its outstanding properties but, on account of the molecular structure of polyester, it has poor release properties, and in order to confer such properties there is generally used the technique of coating the surface with a release component. However, this has disadvantages in that, with the surface being subjected to deformation as a result of processing, the properties deteriorate, and for reasons such as the strength of the coating layer itself being inadequate, performance falls in the case of repeated use. Furthermore, there is also the problem that because of poor adhesive strength between the release layer and the polyester layer, following use in an aqueous environment or following a retort or boiling treatment, there is a marked reduction in performance. In the latter case, there has been proposed overcoming the problem by providing a primer layer or reacting two components in the coating layer with a catalyst, etc, but not only are these methods unsuitable when used in food applications, there is also the problem of a lowering of productivity and it is difficult to stably satisfy the required properties under diverse usage conditions as described above. Now, containers such as metal cans are very popular throughout the world and are essential to our way of life and, hitherto, for the purposes of preventing corrosion, it has been common to apply to the inner and outer faces of the metal can a coating material formed by dissolving or dispersing an epoxy, phenolic or other such thermosetting resin in a solvent, so as to coat the metal surface. However, this kind of thermosetting resin coating method requires a long time for the applied material to dry, so that productivity is reduced, and there is also the problem that such a method is undesirable from the point of view of environmental contamination due to the large amount of organic solvent employed.

As a method for resolving these properties, there is the method of laminating a film to the metal can material, namely steel or aluminium sheet or metal sheet obtained by subjecting such metal sheet to a surface treatment like plating. When a metal can is produced by subjecting the film-laminated metal sheet to deep-drawing or ironing, the following properties are demanded of the film.

(1) It should be outstanding in its lamination to the metal sheet.

(2) It should be outstanding in its adhesion to the metal sheet.

(3) It should be outstanding in its processability and no defects such as pin holes should be produced following fabrication.

(4) The polyester film should not separate away, or show cracking or pin hole generation when the metal can is subject to impact.

(5) There should be no adsorption of aroma components from the can contents by the film, nor will the flavour of the contents be harmed by materials dissolved out of the film (referred to below as the taste characteristics).

(6) The contents will not stick to the can walls or to the can bottom, and it will be possible to remove the contents readily (below this is referred to as the non-stick property).

Many proposals have been made hitherto in order to meet these requirements. For example, in U.S. Pat. No. 5,240,779 and U.S. Pat. No. 5,384,354, there are disclosed copolyester films of specified density and planar orientation coefficient, or polyester films based on a combination of specified polyester components. However, these proposals do not altogether wholly satisfy the aforesaid diverse property requirements and, in particular, in applications where non-stick properties are further demanded along with outstanding lamination, impact resistance and heat resistance, it is difficult to simultaneously provide such characteristics.

Objective of the Present Invention

The objective of the present invention lies in resolving the aforesaid problems of the prior art and providing a biaxially-oriented polyester film for fabrication which shows outstanding release properties following repeated use, use after fabrication or use in an aqueous environment and, furthermore, which exhibits stable properties with little variation and, in particular, is outstanding in its lamination, fabrication, impact resistance and non-adsorption properties.

Disclosure of the Invention

In the present invention, in order for the contact angle to water and the surface free energy to fall within these ranges, it is preferred that a wax compound or silicone compound be added. The amount of wax compound, etc, added is preferably 0.001 to 5 wt %, more preferably 0.1 to 2 wt % and in particular 0.3 to 1.5 wt %. As examples of the wax compounds which can be used here, there are the esters of aliphatic carboxylic acid compounds and aliphatic alcohol compounds, and the amides of aliphatic carboxylic acid compounds and aliphatic amine compounds, and preferably the wax is composed of a compound in which the total number of carbons is 30 to 120, and more preferably 40 to 100. As examples of such compounds, synthetic or natural waxes comprising aliphatic esters like stearyl stearate, carnauba wax, candelilla wax, rice wax, pentaerythritol full ester, behenyl behenate, palmityl myristate and stearyl triglyceride, are preferred from the point of view of compatibility with the polyester. Moreover, as examples of silicone compounds, there can be used those having a silicone structure in the main chain or in side chains, and compounds having a molecular weight of 50 to 10,000 are preferred.

In particular, from the point of view of outstanding release properties following repeated use, use after fabrication and use in an aqueous environment, and from the point of view of manifesting non-adsorption properties and enhancing hygiene in food packaging applications, etc, the addition of carnauba wax is preferred and especially refined carnauba wax. The amount of the carnauba wax compound or the like added to the film is preferably from 0.1 to 2 wt %, more preferably 0.2 to 0.9 wt % and in particular from 0.3 to 0.8 wt %.

As a result of a thorough investigation into methods for adding and incorporating carnauba wax into the polyester in the present invention, it was found that, in terms of enhancing the carnauba wax dispersion properties and manifesting stable properties, and also in terms of suppressing contamination in the film production process, the following methods of addition in the polymerization process are preferred:—

(1) The method of adding the carnauba wax at the time of the polyester polymerization, and (2) The method of producing, by polymerization, a master batch (a carnauba wax master polyester) to which a large quantity of carnauba wax is added, and then mixing this with a specified amount of polyester containing no, or just a small amount of, carnauba wax (the diluent polyester) and kneading.

In the present invention, in the case of polyester where carnauba wax is added, carrying out the polymerization using a germanium catalyst is especially preferred from the point of view of enhancing the dispersion properties, and it is preferred that the germanium element content be from 1 to 200 ppm, more preferably 10 to 100 ppm and in particular 20 to 80 ppm. Again, in the case of obtaining film by method (2), it is preferred that there be used germanium catalyst as described above for the carnauba wax master polymer but the diluent polymer is not restricted to one employing germanium catalyst. Consequently, depending on the preparation method for adding wax to the polymer, and depending on whether there is used a master batch or again on whether the film has a composite structure, the germanium element content in the film is preferably 0.1 to 200 ppm, more preferably 1 to 200 ppm, still more preferably 10 to 100 ppm and in particular 20 to 80 ppm.

The biaxially-oriented polyester film for fabrication of the present invention which meets such objectives is a biaxially-oriented polyester film for fabrication characterized in that it is a film comprising polyester in which ethylene terephthalate units and/or ethylene naphthalate units are the chief structural component, and the melting point of said film is 180–270° C., the angle of contact to water is 70°–120°, and the planar orientation coefficient is 0.08–0.15.

Furthermore, preferred embodiments of the biaxially-oriented polyester film for fabrication of the present invention are those where the surface free energy is 20–40 mN/m, where there is contained 0.1 to 2 wt % of wax compound and/or silicone compound, where there are 0.2 to 5 wt % of inorganic particles and/or organic particles present in the film, where the carnauba wax content is 0.1 to 2 wt % and the germanium element content is 1 to 200 ppm, where production is carried out by dilution of a master batch containing 1 to 200 ppm of germanium element and 1 to 10 wt % of carnauba wax, and where it is a composite film comprising a structure with two or more layers at least one face of which consists of the aforesaid polyester film, and this biaxially-oriented polyester film for fabrication is ideally used in packaging applications and laminating to metal sheet.

Best Mode for Carrying out the Invention

The biaxially-oriented polyester film for fabrication of the present invention is a polyester wherein ethylene terephthalate units and/or ethylene naphthalate units are the chief structural component.

In the present invention, this polyester wherein ethylene terephthalate units and/or ethylene naphthalate units are the chief structural component is a polyester in which the ethylene terephthalate units and/or ethylene naphthalate units constitute at least 70 mol % and, from the point of view of heat resistance and impact resistance, preferably at least 85 mol % and more preferably at least 95 mol %.

There may be copolymerized other dicarboxylic acid and/or glycol components, and as the dicarboxylic acid component there can be used for example an aromatic carboxylic acid such as isophthalic acid, naphthalenedicarboxylic acid, diphenyldicarboxylic acid, diphenylsulphone dicarboxylic acid, diphenoxyethanedicarboxylic acid, 5-sodiumsulpho-isophthalic acid or phthalic acid, an aliphatic dicarboxylic acid such as oxalic acid, succinic acid, adipic acid, sebacic acid, dimer acid, maleic acid or fumaric acid, an alicyclic dicarboxylic acid such as cyclohexane dicarboxylic acid, or a hydroxycarboxylic acid such as p-hydroxybenzoic acid. Furthermore, as the glycol component, there can be used for example an aliphatic glycol such as propanediol, butanediol, pentanediol, hexanediol or neopentyl glycol, an alicyclic glycol such as cyclohexanedimethanol, an aromatic glycol such as bisphenol A or bisphenol S, or diethylene glycol. There may also be used two or more types of such dicarboxylic acid or glycol components.

Furthermore, insofar as the effects of the present invention are not impaired, it is also possible to copolymerize a polyfunctional compound such as trimellitic acid, trimesic acid or trimethylolpropane in the polyester or copolyester used in the present invention.

In the present invention, components which are preferably copolymerized are, for example, butanediol, diethylene glycol, polyethylene glycol, cyclohexanedimethanol, sebacic acid, adipic acid, dimer acid, isophthalic acid and naphthalenedicarboxylic acid.

From the point of view of the heat resistance and the fabrication properties, it is necessary in the present invention that the melting point of the film lies in the range 180 to 270° C. Furthermore, in terms of preventing change with passage of time following fabrication, the melting point of the film is preferably 246–265° C. and more preferably 250–260° C.

In the present invention, from the point of view of the lamination, fabrication and impact resistance properties, it is necessary that the planar orientation coefficient ($f_n$) of the biaxially-oriented film lies in the range 0.08 to 0.15. If the planar orientation coefficient lies below this range, the impact resistance is impaired, while if it lies above this range then the lamination and fabrication properties are impaired. From the point of view of the impact resistance and fabrication properties, it is particularly preferred that the planar orientation coefficient lies in the range 0.120 to 0.145.

From the point of view of the lamination and fabrication properties, the difference between the film lengthwise direction refractive index ($n_x$) and the widthwise direction refractive index ($n_y$) of the biaxially-oriented polyester film for fabrication of the present invention (the birefringence: $\Delta n = n_x - n_y$) preferably lies in the range −0.001 to −0.050, and more preferably $\Delta n$ lies in the range −0.005 to −0.02.

Moreover, in the present invention, from the point of view of the mould release and non-stick properties, it is necessary that the contact angle in terms of water be from 70° C. to 120°, more preferably from 75° to 110°, still more preferably from 80° to 100° and in particular from 85° to 100°. If the contact angle with water exceeds 120°, the film is too slippery and its winding and processing properties may be impaired, and the nip in lamination or the support in fabrication may be unstable.

Furthermore, in the present invention, it is preferred from the point of view of further enhancing the release and non-stick properties that the surface free energy be 20–40 mM/m, and more preferably 22–38 mN/m, 25–35 mN/m.

The film structure of the biaxially-oriented polyester film for fabrication of the present invention may of course be a monolayer, but it may also be a laminate structure of two layers A/B, three layers A/B/A or A/B/C, or more than three layers, and the laminate thickness ratio may be freely set, but two layers A/B are preferred.

Here, the A layer, which is that not facing the steel sheet, is the layer which is to display non-stick properties. Using lamination so that an aforesaid wax compound or silicone compound is added to the A layer which is to display the non-stick properties, or coating just the A layer side, is preferred from the point of view of suppressing offset to the non-stick face and enhancing processability and productivity.

In the present invention, from the point of view of the heat resistance and the impact resistance following processing, it is necessary that the polyester in which ethylene terephthalate units and/or ethylene naphthalate units are the chief structural component be biaxially-oriented. The biaxial orientation method may be by inflation drawing, simultaneous biaxial drawing or sequential biaxial drawing but simultaneous biaxial drawing or sequential biaxial drawing are preferred.

Furthermore, in the present invention, from the point of view of processability, it is preferred that the average breaking elongation at 100° C. in the lengthwise and widthwise directions be 200–500% and more preferably 250–450%.

Moreover, in terms of uniformity of impact resistance and processability in each direction, it is preferred that the absolute value of the difference between the lengthwise direction breaking elongation and the widthwise direction breaking elongation at 100° C. be no more than 50%, with no more than 50%, with no more than 40% being particularly preferred. Furthermore, clockwise from the lengthwise direction, the average of the breaking elongation in the direction at 45° and the breaking elongation in the direction at 135°, is preferably 200–500% and more preferably 250–450%, at 100° C. In addition, the absolute value of the difference between the lengthwise direction breaking elongation and the breaking elongation in the direction 45° clockwise from the lengthwise direction, at 100° C., is preferably no more than 50% and in particular no more than 40%. Here, the breaking elongation is the value measured using a Tensilon (tensile testing machine) at an extension rate of 500 mm/min, in an atmosphere at 100° C. and 65% RH, for a sample of length 50 mm and width 10 mm.

In the present invention, from the point of view of processability and heat resistance, the intrinsic viscosity of the polyester is preferably 0.4 to 1.5 dl/g, more preferably 0.5 to 1.3 dl/g and, in particular, 0.6 to 1.2.

In the present invention, a film density of from 1.35 to 1.41 g/cm$^3$ is preferred in terms of good processability, with the range 1.36 to 1.4 g/cm$^3$ being particularly preferred. If the density is too low, the fabrication properties are impaired due to wrinkles, etc, while if the density is too high unevenness in the processability is produced.

When producing the polyester from which the biaxially-oriented polyester film for fabrication of the present invention is composed, it is possible to use a reaction catalyst. Examples of the reaction catalyst are alkali metal compounds, alkaline earth metal compounds, zinc compounds, lead compounds, manganese compounds, cobalt compounds, aluminium compounds, antimony compounds and titanium compounds, and as discoloration preventing agents there can be used phosphorus compounds for example. Preferably, normally at any stage prior to the completion of the polyester production, an antimony compound, a germanium compound or a titanium compound is added as polymerization catalyst.

As examples of such methods, taking the particular case of a germanium compound there is the method of adding a germanium compound powder as it is, or the method of adding a germanium compound dissolved in the glycol component which comprises the polyester starting material as described in JP-B-54-22234. Examples of the germanium compounds include germanium dioxide, germanium hydroxide containing water of crystallization, germanium alkoxides such as germanium tetramethoxide, germanium tetraethoxide, germanium tetrabutoxide and germanium ethyleneglycoxide, germanium phenoxide compounds such as germanium phenolate and germanium β-naphtholate, phosphorus-containing germanium compounds such as germanium phosphate and germanium phosphite, germanium acetate and the like. Of these, germanium dioxide is preferred. As antimony compounds, there can be used for example an antimony oxide such as antimony trioxide, or antimony acetate. As titanium compounds, there can be favourably employed alkyl titanate compounds such as tetraethyl titanate and tetrabutyl titanate.

Next, there is explained the case of the addition of germanium dioxide as the germanium compound when producing polyethylene terephthalate. The terephthalic acid component and the ethylene glycol are made to undergo ester-interchange or esterification, the germanium dioxide and phosphorus compound then added after which, under high temperature and reduced pressure, the polycondensation reaction is conducted until there is a specified diethylene glycol content, and polymer containing the element germanium is thereby obtained. Furthermore, preferably the polymer obtained is subjected to a solid phase polymerization at a temperature below the melting point under reduced pressure or in an inert atmosphere, so that the acetaldehyde content is reduced, and a specified intrinsic viscosity and carboxyl end-groups are obtained.

In the present invention, from the point of view of enhancing the compatibility with wax, the carboxyl end-group content of the polyester is preferably 30–55 eq/ton (equivalents per ton), more preferably 35–50 eq/ton and in particular 40–48 eq/ton.

Again, it is desirable from the point of view of hygiene properties, and also in terms of the maintenance of good hygiene properties with passage of time or when subject to a thermal history as a result of processing, that the polyester in the present invention has a diethylene glycol component content preferably in the range 0.01 to 4 wt %, more preferably in the range 0.01 to 3 wt % and in particular in the range 0.01 to 2 wt %. Furthermore, there may be added from 0.0001 to 1 wt % of antioxidant. Moreover, diethylene glycol may also be added at the time of polymer production within a range such that the properties are not impaired.

In addition, it is desirable in terms of ensuring good hygiene properties that the acetaldehyde content of the film preferably be no more than 30 ppm, more preferably no more than 25 ppm and in particular no more than 20 ppm. With regard to the method for keeping the acetaldehyde content of the film no more than 30 ppm, there is the method of eliminating the acetaldehyde produced by thermal decomposition at the time of the polyester production in the polycondensation reaction, etc, by heat-treating the polyester under reduced pressure or in an inert gas atmosphere at a temperature below the melting point of the polyester, preferably the method of subjecting the polyester to solid phase polymerization under reduced pressure or in an inert gas atmosphere at a temperature of at least 150° C. but less than the melting point, or the method of melt extrusion using a vacuum vented extruder, or again the method whereby when melt-extruding polymer the extrusion is carried out over a short time, preferably for an average residence time of no more than 1 hour, within the range melting point +30° C. and preferably melting point +25° C., for the highest melting polymer present.

As an example of the method of producing the biaxially-oriented polyester film for fabrication in the present invention, each polyester is optionally dried, after which it is supplied to a known melt extruder and extruded in the form of sheet from a slit-shaped die, then made to closely adhere to a casting drum by a system such as electrostatic pinning, so that it is cooled and solidified and an undrawn sheet obtained. The drawing system may be either a simultaneous or sequential biaxial drawing system, and by subjecting this undrawn sheet to drawing and heat treatment in the film lengthwise and widthwise directions, film is obtained of the desired planar degree of orientation. From the point of view of the film quality, it is preferred that it be based on a stenter system, and either a sequential biaxial drawing system, in which drawing is carried out in the lengthwise direction after which drawing is conducted in the widthwise direction, or a simultaneous biaxial drawing system, in which the lengthwise direction and widthwise direction drawing are performed essentially simultaneously, is desirable. The draw ratio in each direction will be in the range from 1.5 to 4.0, preferably 1.8 to 4.0. Either the lengthwise or the widthwise draw ratio can be greater than the other, or they may both be the same.

The elongation rate is desirably in the range 1000% per minute to 200,000% per minute, and the drawing temperature can be any temperature providing that it is above the glass transition temperature of the polyester and less than the glass transition temperature +80° C., but normally 80–150° C. is preferred.

Furthermore, following the biaxial drawing, the film is subjected to a heat treatment and this heat treatment can be carried out by any known method, for example in an oven or on a heated roller. The heat treatment temperature can usually be any temperature above 120° C. and below 245° C. but, preferably, it is 120–240° C. Again, any heat treatment time can be employed but, normally, it is preferred that the heat treatment be conducted for from 1 to 60 seconds. The heat treatment may also be carried out while allowing the film to relax in its lengthwise direction and/or in its widthwise direction. Moreover, redrawing may be carried out one or more times in each direction, after which heat treatment may also be carried out.

Again, in order to enhance the non-stick property, the handling and the processability of the biaxially-oriented polyester film for fabrication of the present invention, it is necessary to employ internal particles, inorganic particles or organic particles in the film. The amount thereof added is from 0.005 to 10 wt %, but in particular it is preferred that there be from 0.2 to 5 wt %, and more preferably 0.3 to 4 wt %, of the inorganic particles and/or organic particles present in the film. Of such particles, the use of so-called external particles such as inorganic particles and/or organic particles of average particle diameter 0.01 to 10 $\mu$m is preferred. In particular, it is preferred that inorganic particles and/or organic particles of average particle diameter 0.1 to 5 $\mu$m be added to the film used at the inner face of a can. As examples of methods for depositing internal particles, there are the techniques described in JP-A-48-61556, JP-A-51-12860, JP-A-53-41355 and JP-A-54-90397. Furthermore, there may be employed the joint use thereof with other particles as in JP-A-55-20496 and JP-A-59-204617.

If particles of average particle diameter exceeding 10 $\mu$m are used, film defects tend to be produced so this is undesirable. Examples of the inorganic particles and/or organic particles are inorganic particles such as wet-based or dry-based silica, colloidal silica, aluminium silicate, titanium oxide, calcium carbonate, calcium phosphate, barium sulphate, alumina, mica, kaolin and clay, and organic particles with a structural component comprising styrene, silicone, acrylic acid or the like. Of these, there can be cited inorganic particles such as wet-based and dry-based colloidal silica and alumina, and organic particles with a structural component comprising styrene, silicone, acrylic acid, methacrylic acid, polyester, divinyl benzene and the like. Two or more types of such internal particles, inorganic particles and/or organic particles can be jointly employed.

Furthermore, from the point of view of adhesion, the centre line average roughness Ra is preferably in the range 0.005 to 0.1 $\mu$m, more preferably 0.008 to 0.05 $\mu$m. Moreover, high speed processability is enhanced if the ratio in terms of the maximum roughness Rt, that is to say the ratio Rt/Ra, is 1 to 100, and preferably 5 to 50.

Again, in the case where adhesive strength is required at one face, the adhesion properties can be enhanced by carrying out a surface treatment such as a corona discharge treatment and the corona discharge treatment intensity at this time is preferably 5 to 50 W·min/m$^2$, more preferably 10 to 45 W·min/m$^2$.

Additives such as antistatic agents, heat stabilizers, antioxidants, nucleating agents, weathering agents and ultraviolet absorbers can also be employed in the biaxially-oriented polyester film for fabrication of the present invention, in an amount such that the objectives of the present invention are not impaired. Again surface texturizing such as embossing or sand matting, or surface treatments such as a plasma treatment or alkali treatment, can also be carried out where required. Moreover, the film of the present invention can also be coated or printed with treatment agents for facilitating adhesion, or with antistatic agents, moisture- or gas-barrier agents (polyvinylidene chloride or the like), tacky adhesives, adhesives, flame retardants, ultraviolet absorbers, matting agents, pigments, dyes or the like, and, for the purposes of providing light screening properties, moisture/gas barrier properties, surface electro-conductivity, infrared reflective properties or the like, there may be carried out the vacuum deposition of a metal or metal compound such as aluminium, aluminium oxide, silicon oxide, palladium or the like. The objectives thereof and the methods employed are not to be restricted to those mentioned.

The biaxially-oriented polyester film for fabrication of the present invention can be favourably employed for fabrication processes, for example it is ideal for container applications by lamination to metal sheet, paper or the like, and then processing. In particular, it can be favourably used as film for laminating to metal sheet and fabricating, in order to preserve foods containing proteins (for example meat or egg).

Below, practical examples of the present invention are described but these examples are not to restrict the interpretation of the invention in any way.

Measurements and evaluations of the properties were carried out by the following methods.

(1) Melting Point (Tm)

The melting point was measured using a differential scanning calorimeter DSC2 (made by Perkin Elmer). 10 mg of sample was melted and held for 5 minutes at 280° C. under a current of nitrogen, and then rapidly cooled using liquid nitrogen. The sample obtained was heated at a rate of 10° C./minute and the endotherm peak temperature due to crystal melting was taken as the melting point (Tm).

(2) Carboxyl End-group Content

This was determined by dissolving film at 95° C. in o-cresol/chloroform (weight ratio 7/3) and carrying out potentiometry with alkali.

(3) Intrinsic Viscosity

This was measured at 25° C. after dissolving the polyester in o-chlorophenol (4) Film Elongation-I The film elongation was measured at 100° C. in accordance with ASTM-D-882-81 (method A), and the processability assessed as follows. Both grades A and B are satisfactory.

Grade A: average breaking elongation in the lengthwise and widthwise directions =300–500%.

Grade B: average breaking elongation in the lengthwise and widthwise directions =200–300%.

Grade C: average breaking elongation in the lengthwise and widthwise directions =0–200%.

(5) Film Elongation-II

The film elongation was measured at 100° C. in accordance with ASTM-D-882-81 (method A), and the processability assessed as follows. Both grades A and B are satisfactory. This is an index of impact resistance.

Grade A: difference in average breaking elongation in the lengthwise and widthwise directions is 0–50%.

Grade B: difference in average breaking elongation in the lengthwise and widthwise directions is 50–100%.

Grade C: difference in average breaking elongation in the lengthwise and widthwise directions is over 100%.

(6) Film Elongation-III

The film elongation was measured at 100° C. in accordance with ASTM-D-882-81 (method A), and the processability assessed as follows. Both grades A and B are satisfactory.

Grade A: clockwise from the lengthwise direction, the average breaking elongation in the direction at 45° and breaking elongation in the direction at 135°=300–500%.

Grade B: clockwise from the lengthwise direction, the average breaking elongation in the direction at 45° and breaking elongation in the direction at 135°=200–300%

Grade C: clockwise from the lengthwise direction, the average breaking elongation in the direction at 45° and breaking elongation in the direction at 135°=0–200%.

(7) Contact Angle to Water

By the known method and using water as the measurement liquid, the static contact angle of water to the film surface was determined employing a contact angle meter (model CA-D made by Kyowa Kaimen Kagaku K.K.).

(8) Surface Free Energy

By the known method, and using three types of measurement liquid, namely water, ethylene glycol and formamide, the static contact angle of each of these liquids to the film surface was determined employing a contact angle meter (model CA-D made by Kyowa Kaimen Kagaku K.K.). 10 measurements were made for each liquid, then the average contact angle ($\theta$) and the surface tension of the measurement liquid (j) for each component were respectively introduced into the following formula, and the simultaneous equations comprising the three equations solved for $\gamma^L$, $\gamma^+$ and $\gamma^-$.

$$(\gamma^L \gamma_j^L)^{\frac{1}{2}} + 2(\gamma^+ \gamma_j^-)^{\frac{1}{2}} + 2(\gamma_j^+ \gamma^-)^{\frac{1}{2}} = \frac{(1+\cos\theta)}{2}\left[\gamma_j^L + 2(\gamma^+ \gamma^-)^{\frac{1}{2}}\right]$$

$$\gamma = \gamma^L + 2(\gamma^+ \gamma^-)^{\frac{1}{2}}$$

$$\gamma_j = \gamma_j^L + 2(\gamma_j^+ \gamma_j^-)^{\frac{1}{2}}$$

Here, $\gamma$, $\gamma^L$, $\gamma^+$ and $\gamma^-$ respectively denote the surface free energy, the long distance forces term, the Lewis acid parameter and the Lewis base parameter for the film surface.

Furthermore, $\gamma_j$, $\gamma_j^L$, $\gamma_j^+$ and $\gamma_j^-$ respectively denote the surface free energy, the long distance forces term, the Lewis acid parameter and the Lewis base parameter for the measurement liquid used.

For the surface tensions of the liquids used here, there were used the values proposed by Oss ("fundamentals of Adhesion", L. H. Lee (Ed), p153, Plenum ess, New York (1991).)

9) Planar Orientation Coefficient

The planar orientation coefficient was measured using an Abbe refractometer with the sodium D line (wavelength 589 nm) as the light source. From the refractive indexes ($N_x$, $N_y$, $N_z$) in the lengthwise, widthwise and thickness directions, the planar orientation coefficient $f_n$ was determined from the relation $f_n=(N_x+N_y)/2-N_z$.

(10) Processability

After laminating at 70 m/min to a TFS steel sheet (thickness 0.2 mm) heated to 30° C. above the film melting point, rapid cooling was carried out with a water bath at 50° C. The laminated steel sheet was fabricated at a reduction factor of 20% and the processability assessed according to the appearance of the can obtained as follows.

Grade A: film did not show whitening, splitting or wrinkling.

Grade B: some wrinkling or slight whitening of the film seen but no splitting.

Grade C: whitening, splitting and wrinkling of the film seen.

(11) Non-stick Property

The non-stick property was evaluated by eye based on the following grades by ⅔ filling the can obtained with contents comprising a 3:2:1 mixture of egg, meat and flour, and then subjecting the can to a retort treatment for 30 minutes at 125° C., after which it was removed and the state of adhesion to the can walls assessed.

Grade AA: absolutely no adhesion.

Grade A: essentially no adhesion.

Grade B: slight remaining adhering material.

Grade C: adhering material over about ¼ entire can.

Grade D: adhering material over about ½ entire can.

Grade E: adhering material remaining over entire can.

(12) Release Property

20×50 mm cellophane tape was affixed to the film and then peeled away, after which the surface free energy $S_{f2}$ was measured, and then evaluation was performed as follows based on the difference $\Delta S_f$ (mN/m) between this and the original surface free energy $S_{f1}$.

Grade A: 0–1

Grade B: 1–2

Grade C: 2–3

Grade D: 3–5

Grade E: over 5

EXAMPLE 1

As the polyester, chip A of polyethylene terephthalate (antimony trioxide catalyst, intrinsic viscosity 0.65, diethylene glycol 2.8 mol %) to which 0.8 wt % stearyl stearate wax compound had been added, was produced by heat treating an ethylene glycol slurry containing flocculated silica particles for 2 hours at 190° C. and adding the slurry to the esterification product between terephthalic acid and ethylene glycol, and then carrying out the polycondensation reaction. After measuring out a specific quantity of this chip, it was dried under vacuum for 3 hours at 180° C. and supplied to a single screw extruder, then discharged from a normal die and cooled and solidified on a mirror-surface cooled drum while performing electropinning (7 kv) and there was obtained undrawn film containing 0.8 wt % of stearyl stearate type wax compound (drum rotation rate 40 m/min). This undrawn film was drawn by a factor of 2.8 in the lengthwise direction at a temperature of 105° C. and then cooled to 40° C., after which it was pre-heated for 5 seconds at a temperature of 115° C. and then drawn by a factor of 2.8 in the widthwise direction at the same temperature, following which it was given a 5 second 5% relaxation heat treatment at 180° C., and there was obtained the biaxially-oriented polyester film of thickness 16 μm shown in Table 2. As shown in Table 2, it was confirmed that good properties were exhibited.

EXAMPLES 2 and 3

From extruder I (layer A) and extruder II (layer B), and using the polyesters shown in Table 1, laminated biaxially-oriented polyester film of properties as shown in Table 2 was obtained by melting each polyester and superimposing these just in front of the die, and by varying the drawing conditions in Example 1. As shown in Table 2, it was confirmed that outstanding properties were exhibited.

EXAMPLES 4 and 5

Biaxially-drawn polyester film was obtained by varying the polymer compositions and the thicknesses in accordance with Tables 1 and 2. As shown in Table 2, it was confirmed that good properties were exhibited.

EXAMPLE 6

After measuring out specified quantities of polyester (1) and (2) chip in accordance with Tables 1 and 2, these were dried under vacuum for 3 hours at 180° C. and supplied to extruder I (A layer) and extruder II (B layer), and after discharge from an ordinary die, cooling and solidification were carried out on a mirror-surface cooling drum while performing electropinning (7 kv), and undrawn film obtained. This undrawn film was subjected to simultaneous biaxial drawing at a temperature of 105° C. by a factor of 3.4 in the lengthwise direction and by a factor of 3.2 in the widthwise direction, following which the film was given a 5 second 5% relaxation heat treatment at 210° C., and there was obtained the biaxially-oriented polyester film of thickness 15 μm shown in Table 1. As shown in Table 2, it was confirmed that outstanding properties were exhibited.

EXAMPLES 7 to 9

Biaxially-oriented polyester films were obtained in the same way as in Example 6 by varying the polymer compositions and the drawing conditions in accordance with Table 3. As shown in Table 4, it was confirmed that outstanding properties were exhibited. However, in the case of Example 9, since the melting point was lowered, there was a slight reduction in the heat resistance.

COMPARATIVE EXAMPLES 1 to 3

Films were obtained by carrying out film production in the same way as in Example 1 with the types of polyester and the additives changed to those shown in Table 3. It is clear from Table 4 that the films from Comparative Examples 1 to 3 were inferior in their properties.

In the tables, the codes used had the following meanings.

PET: polyethylene terephthalate.
PET/I: polyethylene terephthalate with copolymerized isophthalic acid.
PET/S: polyethylene terephthalate with copolymerized sebacic acid.
PET/S: polyethylene terephthalate with copolymerized naphthalene dicarboxylic acid.

TABLE 1

| | Example Number | | | | | |
|---|---|---|---|---|---|---|
| | 1 | 2 | 3 | 4 | 5 | 6 |
| Polymer (1) | | | | | | |
| Composition | PET | PET | PET | PET | PET/N (5 mol) | PET |
| Polymerization Catalyst | | | | | | |
| Type | $Sb_2O_3$ | $GeO_2$ | $Sb_2O_3$ | $Sb_2O_3$ | $Sb_2O_3$ | $Sb_2O_3$ |
| Conc. (ppm) | Sb:200 | Ge:45 | Sb:100 | Sb:150 | Sb:300 | Sb:180 |
| Particles | | | | | | |
| Type | flocculated silica | spherical silica | flocculated silica | flocculated silica | flocculated silica | flocculated silica |
| Av. particle size (μm) | 0.6 | 0.4 | 1.5 | 1.5 | 2.5 | 1.4 |
| Conc. (%) | 0.04 | 0.3 | 0.15 | 0.2 | 0.14 | 0.1 |
| Particles | | | | | | |
| Type | flocculated silica | spherical silica | | aluminium silicate | | |
| Av. particle size (μm) | 1.2 | 2.5 | | 0.2 | | |
| Conc. (%) | 0.06 | 0.15 | | 0.5 | | |
| Additive | | | | | | |
| Type | stearyl stearate | carnauba wax | silicone compound | calcium stearate | carnauba wax | |
| Conc. (%) | 0.8 | 0.5 | 0.4 | 0.5 | 0.5 | |

TABLE 1-continued

|  | Example Number | | | | | |
|---|---|---|---|---|---|---|
|  | 1 | 2 | 3 | 4 | 5 | 6 |
| Polymer (2) | | | | | | |
| Composition |  | PET | PET/I (5 mol) |  |  | PET |
| Polymerization Catalyst | | | | | | |
| Type |  |  |  |  |  | GeO$_2$ |
| Conc. (%) |  |  |  |  |  | Ge:40 |
| Particles | | | | | | |
| Type |  | spherical silica | flocculated silica |  |  |  |
| Av. particle size (μm) |  | 1.4 | 1.5 |  |  |  |
| Conc. (%) |  | 0.08 | 0.1 |  |  |  |
| Additive | | | | | | |
| Type |  |  |  |  |  | carnauba wax |
| Conc. (%) |  |  |  |  |  | 2.0 |

TABLE 2

|  | Example Number | | | | | |
|---|---|---|---|---|---|---|
|  | 1 | 2 | 3 | 4 | 5 | 6 |
| A-layer | | | | | | |
| Polymer (1)/Polymer (2) | 10/0 | 10/0 | 10/0 | 10/0 | 10/0 | 5/5 |
| Polyester | PET | PET | PET | PET | PET/N (5 mol) | PET |
| Melting Point (° C.) | 254 | 254 | 254 | 254 | 247 | 254 |
| Particles | | | | | | |
| Type | flocculated silica | spherical silica | flocculated silica | flocculated silica | flocculated silica | flocculated silica |
| Av. particle size (μm) | 0.6 | 0.4 | 1.5 | 1.5 | 2.5 | 1.5 |
| Conc. (%) | 0.04 | 0.3 | 0.15 | 0.2 | 0.14 | 0.05 |
| Particles | | | | | | |
| Type | flocculated silica | spherical silica |  | aluminium silicate |  |  |
| Av. particle size (μm) | 1.2 | 2.5 |  | 0.2 |  |  |
| Conc. (%) | 0.06 | 0.15 |  | 0.5 |  |  |
| Additives | | | | | | |
| Type | stearyl stearate | carnauba wax | silicone compound | calcium stearate | carnauba wax | carnauba wax |
| Conc. (%) | 0.8 | 0.5 | 0.4 | 0.5 | 0.5 | 1.0 |
| Ge concentration (%) | 0 | 45 | 0 | 0 | 0 | 10 |
| Thickness | 16 | 2 | 2 | 16 | 18 | 3 |
| B-layer | | | | | | |
| Polymer(1)/Polymer(2) |  | 0/10 | 0/10 |  |  | 10/0 |
| Polyester |  | PET | PET/I (5 mol) |  |  | PET |
| Melting Point (° C.) |  | 254 | 247 |  |  | 254 |
| Particles | | | | | | |
| Type |  | spherical silica | flocculated silica |  |  | flocculated silica |
| Av. particle size (μm) |  | 1.4 | 1.5 |  |  | 1.4 |
| Conc. (%) |  | 0.08 | 0.1 |  |  | 0.1 |

TABLE 2-continued

|  | Example Number | | | | | |
|---|---|---|---|---|---|---|
|  | 1 | 2 | 3 | 4 | 5 | 6 |
| Additives |  |  |  |  |  |  |
| Type |  |  |  |  |  |  |
| Conc. (%) |  |  |  |  |  |  |
| Ge concentration (ppm) |  | 45 | 0 |  |  | 0 |
| Thickness |  | 14 | 14 |  |  | 12 |
| Ge Concentration in Film (ppm) | 0 | 45 | 0 | 0 | 0 | 2 |
| Contact Angle to Water (°) | 82 | 89 | 83 | 73 | 88 | 92 |
| Surface Free Energy | 38 | 36 | 39.5 | 42 | 37 | 33 |
| Carboxyl End Group Content (eq/ton) | 38 | 39 | 35 | 32 | 34 | 43 |
| Intrinsic Viscosity (dl/g) | 0.63 | 0.64 | 0.65 | 0.66 | 0.64 | 0.6 |
| Face Laminated to Metal Sheet |  | B layer | B layer |  |  |  |
| Elastic Modulus (GPa) | 2.7 | 3.2 | 3.0 | 3.4 | 2.7 | 3.3 |
| Elongation (%) |  |  |  |  |  |  |
| Elongation I | A | B | A | B | A | B |
| Elongation II | A | A | B | A | A | B |
| Elongation III | A | B | A | B | A | B |
| Planar Orientation Coefficient | 0.125 | 0.147 | 0.135 | 0.145 | 0.119 | 0.15 |
| Δn | −0.007 | −0.002 | −0.015 | +0.005 | −0.012 | −0.008 |
| Processability | A | B | A | B | A | B |
| Release Property | B | A | C | B | B | A |
| Non-Stick Property | A | AA | B | A | A | AA |

TABLE 3

|  | Example Numbers | | | Comparative Example Numbers | | |
|---|---|---|---|---|---|---|
|  | 7 | 8 | 9 | 1 | 2 | 3 |
| Polymer (1) |  |  |  |  |  |  |
| Composition | PET | PET | PET/I (6 mol) | PET | PET/S | PEN |
| Polymerization Catalyst |  |  |  |  |  |  |
| Type | $Sb_2O_3$ | $Sb_2O_3$ | $GeO_2$ | $Sb_2O_3$ | $Sb_2O_3$ | $Sb_2O_3$ |
| Conc. (ppm) | Sb:200 | Sb:150 | Ge:45 | Sb:150 | Sb:150 | Sb:350 |
| Particles |  |  |  |  |  |  |
| Type | spherical silica | flocculated silica | spherical silica | flocculated silica | spherical silica | flocculated silica |
| Av. particle size (μm) | 0.9 | 0.8 | 1.2 | 1.4 | 0.2 | 0.2 |
| Conc. (%) | 0.08 | 0.12 | 0.08 | 0.05 | 0.08 | 0.07 |
| Particles |  |  |  |  |  |  |
| Type |  |  |  |  |  |  |
| Av. particle size (μm) |  |  |  |  |  |  |
| Conc. (%) |  |  |  |  |  |  |
| Additive |  |  |  |  |  |  |
| Type |  |  |  |  |  |  |
| Conc. (%) |  |  |  |  |  |  |
| Polymer (2) |  |  |  |  |  |  |
| Composition | PET | PET | PET/I (5 mol) |  |  |  |
| Polymerization Catalyst |  |  |  |  |  |  |
| Type | $GeO_2$ | $GeO_2$ | $GeO_2$ |  |  |  |
| Conc. (%) | Ge:50 | Ge:50 | Ge:45 |  |  |  |
| Additive |  |  |  |  |  |  |
| Type | carnauba wax | carnauba wax | carnauba wax |  |  |  |
| Conc. (%) | 0.7 | 1 | 0.5 |  |  |  |

TABLE 4

|  | Example Number | | | Comparative Example Number | | |
| --- | --- | --- | --- | --- | --- | --- |
|  | 7 | 8 | 9 | 1 | 2 | 3 |
| A-layer |  |  |  |  |  |  |
| Polymer (1)/Polymer (2) | 0/10 | 7/3 | 0/10 | 10/0 | 10/0 | 10/0 |
| Polyester | PET | PET | PET/I | PET | PET/S | PEN |
| Melting Point (° C.) | 254 | 254 | 242 | 254 | 222 | 265 |
| Particles |  |  |  |  |  |  |
| Type |  | flocculated silica |  | flocculated silica | spherical silica | flocculated silica |
| Av. particle size (μm) |  | 0.8 |  | 1.4 | 0.2 | 0.2 |
| Conc. (%) |  | 0.84 |  | 0.05 | 0.08 | 0.07 |
| Additives |  |  |  |  |  |  |
| Type | carnauba wax | carnauba wax | carnauba wax |  |  |  |
| Conc. (%) | 0.7 | 0.3 | 0.5 |  |  |  |
| Ge concentration (%) | 50 | 15 | 45 | 0 |  | 0 |
| Thickness | 5 | 15 | 1 | 16 |  | 15 |
| B-layer |  |  |  |  |  |  |
| Polymer(1)/Polymer(2) | 10/0 |  | 10/0 |  |  |  |
| Polyester | PET |  | PET/I |  |  |  |
| Melting Point (° C.) | 254 |  | 242 |  |  |  |
| Particles |  |  |  |  |  |  |
| Type | spherical silica |  | spherical silica |  |  |  |
| Av. particle size (μm) | 0.9 |  | 0.8 |  |  |  |
| Conc. (%) | 0.08 |  | 0.08 |  |  |  |
| Additive |  |  |  |  |  |  |
| Type |  |  |  |  |  |  |
| Conc. (%) |  |  |  |  |  |  |
| Ge concentration (ppm) | 0 |  | 45 |  |  |  |
| Thickness | 10 |  | 14 |  |  |  |
| Ge Concentration in Film (ppm) | 17 | 15 | 45 | 0 | 0 | 0 |
| Contact Angle to Water (°) | 90 | 85 | 89 | 67 | 64 | 65 |
| Surface Free Energy | 34 | 38 | 38 | 45 | 46 | 46 |
| Carboxyl End Group Content (eq/ton) | 40 | 34 | 29 | 22 | 35 | 28 |
| Intrinsic Viscosity (dl/g) | 0.6 | 0.6 | 0.58 | 0.75 | 0.57 | 0.62 |
| Face Laminated to Metal Sheet | B layer |  | B layer |  |  |  |
| Elastic Modulus (GPa) | 2.9 | 3.6 | 3.1 | 4.1 | 2.4 | 4.9 |
| Elongation (%) |  |  |  |  |  |  |
| Elongation I | A | B | A | C | B | C |
| Elongation II | A | B | A | C | B | C |
| Elongation III | A | B | A | C | B | C |
| Planar Orientation Coefficient | 0.145 | 0.15 | 0.134 | 0.168 | 0.078 | 0.17 |
| Δn | −0.01 | +0.003 | −0.015 | −0.025 | −0.015 | −0.025 |
| Processability | B | B | A | C | B | C |
| Release Property | A | B | B | E | E | E |
| Non-Stick Property | A | B | B | E | E | E |

What is claimed is:

1. Biaxially-oriented polyester film for fabrication which is characterized in that it is a film comprising polyester in which ethylene terephthalate units and/or ethylene naphthalate units are the chief structural component and containing 0.1–2 wt % of a carnauba wax and 1 to 200 ppm of germanium, and the melting point of said film is 180–270° C., the angle of contact to water is 70°–120°, and the planar orientation coefficient is 0.08–0.15.

2. Biaxially-oriented polyester film for fabrication according to claim 1 where the surface free energy is 20–40 mN/m.

3. Biaxially-oriented polyester film for fabrication according to claim 1 which is characterized in that 0.2–5 wt % of inorganic particles and/or organic particles are included in the film.

4. Biaxially-oriented polyester film for fabrication which is characterized in that it is a laminate film comprising a structure of at least two layers, and at least one face is polyester film according to claim 1.

5. Biaxially-oriented polyester film for fabrication according to claim 1 which is characterized in that it is used in food packaging applications.

6. Biaxially-oriented polyester film for fabrication according to claim 1 which is characterized in that it is used by lamination to metal sheet.

7. A method of producing the biaxially-oriented polyester film for fabrication according to claim 1 which is characterized in that production is carried out by dilution of a master batch containing 1–200 ppm of germanium element and 1–10 wt % of carnauba wax.

8. Biaxially-oriented polyester film for fabrication according to claim 1 which is characterized in that the average of the lengthwise and widthwise breaking elongation at 100° C. is 200 to 500%.

9. Biaxially-oriented polyester film for fabrication according to claim 1 which is characterized in that the absolute value of the difference between the lengthwise breaking elongation and the widthwise breaking elongation at 100° C. is no more than 50%.

10. Biaxially-oriented polyester film for fabrication according to claim 1 where the melting point of the film is 246–265° C.

* * * * *